United States Patent
Ott et al.

(10) Patent No.: US 7,762,630 B2
(45) Date of Patent: Jul. 27, 2010

(54) MOTOR VEHICLE SEAT

(75) Inventors: Richard Ott, Kümmersbruck (DE); Hermann Meiller, Wernberg_Koeblitz (DE)

(73) Assignee: Grammer AG, Amberg (DE)

( * ) Notice: Subject to any disclaimer, the term of this patent is extended or adjusted under 35 U.S.C. 154(b) by 264 days.

(21) Appl. No.: 11/827,097

(22) Filed: Jul. 9, 2007

(65) Prior Publication Data
US 2008/0023995 A1    Jan. 31, 2008

(30) Foreign Application Priority Data
Jul. 12, 2006    (DE) .................. 10 2006 032 151

(51) Int. Cl.
*B60N 2/04* (2006.01)
*B60N 2/02* (2006.01)

(52) U.S. Cl. ..................................... 297/341
(58) Field of Classification Search .............. 297/340, 297/341
See application file for complete search history.

(56) References Cited

U.S. PATENT DOCUMENTS

| | | | | |
|---|---|---|---|---|
| 2,922,461 A * | 1/1960 | Braun | ............. | 297/216.15 |
| 4,738,485 A * | 4/1988 | Rumpf | .............. | 297/216.19 |
| 5,437,494 A * | 8/1995 | Beauvais | ............ | 297/216.19 |
| 5,558,399 A * | 9/1996 | Serber | ............... | 297/284.4 |
| 5,622,406 A * | 4/1997 | Meschkat et al. | ........... | 297/318 |
| 5,735,574 A | 4/1998 | Serber | ................ | 297/284.4 |
| 6,334,648 B1 * | 1/2002 | Girsberger et al. | ...... | 297/216.19 |
| 6,742,840 B2 * | 6/2004 | Bentley | ................. | 297/316 |
| 2005/0258677 A1 | 11/2005 | Garrido | | |

FOREIGN PATENT DOCUMENTS

| | | |
|---|---|---|
| DE | 25 49 836 | 5/1976 |
| DE | 36 08 827 | 1/1987 |
| DE | 35 41 299 | 2/1989 |
| DE | 4405653 | 8/1994 |
| DE | 19853156 | 5/2000 |
| DE | 199 27 508 | 3/2001 |
| EP | 0 229 625 | 1/1987 |
| EP | 1057725 A2 | 12/2000 |

* cited by examiner

*Primary Examiner*—Joseph F Edell
(74) *Attorney, Agent, or Firm*—Ballard Spahr LLP

(57) ABSTRACT

The invention relates to a motor vehicle seat comprising a base frame for attachment to a motor vehicle and also comprising a seat frame and a backrest frame which are adjustably attached to the base frame and are compulsorily coupled by a synchronisation device in such a way that, during a movement of the backrest frame relative to the base frame, a compulsory pivoting movement of the seat frame takes place. The synchronisation device is designed for a non-proportional pivoting movement of the seat frame during a movement of the backrest frame.

8 Claims, 3 Drawing Sheets

MOTOR VEHICLE SEAT

CROSS REFERENCE TO RELATED APPLICATIONS

This application is a convention application of German Application Serial Number 10 2006 032 151.0, filed Jul. 12, 2006, which application is hereby incorporated by this reference in its entirety.

FIELD OF INVENTION

The invention relates to a motor vehicle seat comprising a base frame for attachment to a motor vehicle and also comprising a seat frame and a backrest frame which are adjustably attached to the base frame and are compulsorily coupled by means of a synchronisation device in such a way that, during a movement of the backrest frame relative to the base frame, a compulsory pivoting movement of the seat frame relative to the base frame and/or to the backrest frame takes place, according to the preamble of claim 1.

BACKGROUND OF THE INVENTION

A known motor vehicle seat comprises a seat frame and a backrest frame which is attached to the seat frame, said backrest frame and said seat frame each being intended to hold cushion means in order to be able to provide a comfortable and safe seating possibility for an occupant of a motor vehicle. The seat frame is designed to be displaceably fitted in the motor vehicle in order to allow adaptation to different sizes of vehicle occupants. The backrest frame is fitted such that it can pivot relative to the seat frame and thus allows adjustment of an angle of inclination, in particular with respect to a vertical direction.

DE 199 27 508 A1 discloses a seat for an occupant of a motor vehicle, said seat comprising an underframe which can be fixedly connected to a floor of the motor vehicle and also comprising a seat part mounted on the underframe, said seat part having a seat surface and a backrest which, in the event of an accident, is pivoted about an axis running transversely to the direction of travel by a force exerted on the seat by the vehicle occupant. In order to make the backrest steeper in the event of a rear impact on the vehicle by the forces of inertia exerted on the seat by the vehicle occupant and thus to avoid or attenuate the so-called ramping effect due to a steeper backrest, it is proposed in DE 199 27 508 A1 that the axis is arranged above the seat surface and that the seat part is lowered at its front end in the direction of travel and raised at its rear end in the direction of travel when, in the event of a rear impact on the motor vehicle, the force or an acceleration of the motor vehicle exceeds a given value.

DE 35 41 299 C2 describes a seat comprising a backrest and a seat cushion and also a backrest cushion, wherein the backrest cushion inclines backwards and at the same time pushes the seat cushion forwards when a seat user changes from an essentially upright seating position into a backwardly inclined seating position, and wherein the backrest cushion and the seat cushion are connected via a common pivot axle which can be displaced in stationary guides.

EP 0 229 625 discloses a vehicle seat for public transport comprising a seat underframe which is fixed to the floor and a rigid seat shell which consists of a seat part and a back part and which can be held on the seat underframe by means of a pivotable support and can be pivoted with the aid of the latter from a seating position to a lying position.

SUMMARY OF THE INVENTION

The object of the invention is to provide a vehicle seat which allows improved adjustment of the seat surface and of the backrest.

This object is achieved by the features of claim 1.

One essential point of the invention consists in that, in a motor vehicle seat of the type described in the introduction, a synchronisation device is designed for a non-proportional pivoting movement of a seat frame during a movement of a backrest frame relative to a base frame. As a result, a pivoting movement of the backrest frame with respect to the base frame gives rise to a compulsory relative movement of the seat frame with respect to the backrest frame in the form of a pivoting movement. This allows a particularly advantageous adaptation of the orientation of the seat frame and backrest frame to anatomical conditions, which are determined by the structure of the human spinal column and the rest of the skeleton. In the case of a known vehicle seat, the inclination of the backrest frame can indeed be adjusted but remains unaffected by the adjusting movement of the seat frame. By contrast, the synchronisation device brings about a coupling between the adjustment of the seat frame and the inclination adjustment of the backrest frame, wherein a non-proportional relationship is established between the two adjusting movements so as advantageously to be able to take account of aspects such as a curvature of the spinal column of the user and a pelvic position of the user.

The seat frame is attached in a pivotable manner to the base frame, wherein a virtual pivot axis for the seat frame is arranged at a distance from the seat frame in a region remote from the base frame, preferably above a seat surface of the seat frame, particularly preferably at a fixed location. As a result, a comfortable orientation of the seat frame and of the seat surface attachable thereto can be achieved. The seat frame is attached to the base frame by means of lever guides, sliding bearings, pivoting hinges or combinations thereof in such a way that a pivot axis for the pivoting movement of the seat frame is arranged at a distance from the seat frame and does not intersect the latter. This is therefore not a physical pivot axis but rather merely a non-physical, i.e. virtual pivot axis defined by pivoting means. The virtual pivot axis is preferably arranged above the seat surface in the case of a motor vehicle seat installed in a motor vehicle. Particularly preferably, the pivot axis is oriented essentially horizontally and transversely to the direction of travel of the motor vehicle and is located in a region in which approximately the hip of the user is arranged when the user is sitting on the motor vehicle seat. A particularly advantageous tilting of the seat frame can thus be carried out in order to achieve a position of the hip joint and of the thigh resting on the seat surface which is comfortable for the user.

It is provided that a pivot axis of the backrest frame is oriented essentially parallel to the pivot axis of the seat frame and intersects the backrest frame. An anatomically correct pivoting of the backrest thus takes place when a compulsory pivoting movement of the seat frame is brought about as a result of an adjustment of the backrest frame.

In one embodiment of the invention, it is provided that the synchronisation device has a first control surface which is assigned to the seat frame and is preferably of convex shape and a second control surface which is assigned to the backrest frame and is preferably of convex shape, which control surfaces are designed for compulsory movement transmission between the seat frame and the backrest frame. By means of the control surfaces arranged opposite to one another and in touching contact, a simple-to-produce, functionally reliable and cost-effective synchronisation device can be achieved. Here, the preferably convex control surfaces serve for transmitting force and movement between the seat frame and the backrest frame, wherein a static overdetermination between the seat frame and the backrest frame can be avoided due to the convex shape of the control surfaces. Such a static overdetermination could arise for example when using control levers for force transmission, and could lead to jamming of the synchronisation device. In one preferred embodiment of the invention, the control surfaces of the seat frame and of the backrest frame are arranged with respect to one another in such a way that, during a relative movement of the seat frame with respect to the base frame, a pure rolling movement of the control surfaces takes place. In the case of a pure rolling movement, at least almost no sliding movement, preferably no sliding movement, takes place between the control surfaces, but rather the surface speeds of the opposite control surfaces are equal to one another when carrying out the relative movement, so that there is at least almost no friction between the control surfaces and thus almost no wear occurs.

In a further embodiment of the invention, it is provided that the seat frame has, in a front region facing away from the backrest frame, an arc-shaped elongate hole guide which is attached to the base frame by means of a guide pin, and that the base frame has, in a rear region facing towards the backrest frame, a sliding surface which is shaped in a manner corresponding to the seat frame and is in the form of a cylindrical sleeve in some sections, on which sliding surface the seat frame bears in such a manner that it can be displaced compulsorily by the synchronisation device. The elongate hole guide in the front region of the seat frame, which can preferably be embodied in the manner of a guide groove or an opening which is closed on all sides, ensures that the pivoting movement of the seat frame is delimited by the active connection between the guide pin fixed to the base frame and the closed end region of the elongate hole. Thus even in the case of high accelerations of the seat frame, as may occur for example if the motor vehicle strikes an obstacle, reliable guidance of the seat frame on the base frame can be ensured. With regard to the sliding guide formed in the rear seat frame section, it is particularly important that the greatest load on the seat frame caused by the weight force of the user occurs at this point, which leads to a high surface pressure on an articulation between the seat frame and the base frame unless a suitably large sliding bearing surface is provided. Due to the sliding surface in the form of a cylindrical sleeve, it can be ensured that a large-surface sliding bearing with a low surface pressure can be achieved in a simple manner on the seat frame and on the base frame. The virtual pivot axis, which is preferably arranged above the seat surface, is determined by the cooperation between the arc-shaped elongate hole guide and the sliding guide in the form of a cylindrical sleeve, the circle centres of which are arranged at least essentially concentrically with respect to one another. A readily possible lifting of the seat frame from the base frame is prevented by the synchronisation device, which with its cam-type control surfaces serves as a holding-down device for the seat frame and ensures a form-fitting coupling between the seat frame and the backrest frame even in the case of high acceleration in the event of an impact.

In a further embodiment of the invention, it is provided that the synchronisation device is designed for pivoting movements of the seat frame and backrest frame in the same direction. In the case of pivoting movements of the seat frame and backrest in the same direction, a movement of the seat frame in the clockwise direction leads to a pivoting movement of the backrest frame likewise in the clockwise direction, and vice versa. A particularly anatomical orientation of the backrest with respect to the seat frame can thus be achieved.

In a further embodiment of the invention, it is provided that the backrest frame has an adjustment device which is assigned to the synchronisation device and is designed for an inclination adjustment of the backrest frame independently of a position of the seat frame. The adjustment of the inclination of the backrest frame relative to a vertical direction independently of the synchronisation device allows individual adaptation of the motor vehicle seat to the requirements of the user. Preferably, the adjustment device is designed in such a way that a pivot axis of the adjustment device is oriented parallel, particularly preferably concentrically, to the pivot axis of the synchronisation device and thus allows "overriding" of the compulsory coupling between the seat frame and the backrest frame established by the synchronisation device. Like the other adjustment possibilities on the motor vehicle seat, the adjustment device can be actuated manually and/or in a force-assisted manner, in particular in a manner assisted by a gas spring or an electric drive.

In a further embodiment of the invention, it is provided that the backrest frame is assigned a contour adjustment device which is preferably compulsorily coupled to the synchronisation device and is provided for changing a profiling of a backrest cushion that can be attached to the backrest frame. With a change in position of the backrest frame and an associated change in inclination of the seat frame, the user of the motor vehicle seat assumes different seating positions in which different support of the spinal column is also required. In order to meet these different requirements, the backrest frame is assigned a contour adjustment device which makes it possible to change a profiling of the backrest for example by changing the curvature of a lower region of the backrest adjacent to the seat surface in such a way that it is curved out to a greater or lesser extent from the backrest in order to allow greater or less support of the user's lumbar region. Due to the compulsory coupling which is preferably provided between the contour adjustment device and the synchronisation device, each angle of inclination of the backrest frame with respect to a vertical direction is assigned a predefined contouring or profiling of the backrest, so that for example a considerable profiling or curvature is provided in the case of an upright backrest, i.e. a backrest that is almost parallel to the vertical direction, and thus good support of the lumbar region is ensured. By contrast, little profiling of the backrest may be provided in the case of a backrest that is greatly inclined with respect to the vertical direction, in order to allow a particularly comfortable seating position.

In a further embodiment of the invention, it is provided that the contour adjustment device comprises two curved contour rods which extend essentially along side cheeks of the backrest frame and are pivotably attached to the backrest frame, said contour rods preferably being compulsorily coupled by means of a coupling rod arranged such that it can be pivoted out between the side cheeks. A local curvature of the backrest can be achieved by means of the contour rods, which are in each case curved in the manner of an upside-down question mark and thus have a greater curvature in a region adjacent to the seat frame while being designed with much less curvature in a region remote from the seat frame. The contour rods extend essentially parallel to the side cheeks, i.e. to the essentially vertically running frame parts of the backrest frame, and are pivotably attached to the backrest frame. Here, a pivot axis for the contour rods runs essentially parallel to the lesser curved sections of the contour rods, so that as a result almost no change in profile is brought about when the contour rods are pivoted. By contrast, the greatly curved regions of the contour rods in the region adjacent to the seat frame pivot out when a pivoting movement of the contour adjustment device is carried out, so as to change the profiling of the backrest. Here, the contour rods are pivoted in opposite directions and are kinematically coupled to one another by means of a coupling rod running in an essentially horizontal direction so as to ensure symmetrical profiling of the backrest and to simplify actuation of the contour rods.

Further advantages and features of the invention will emerge from the claims and from the following description of preferred examples of embodiments of the invention, which are explained with reference to the drawings. In the drawings:

DESCRIPTION OF THE PREFERRED EMBODIMENTS

Figure 1:
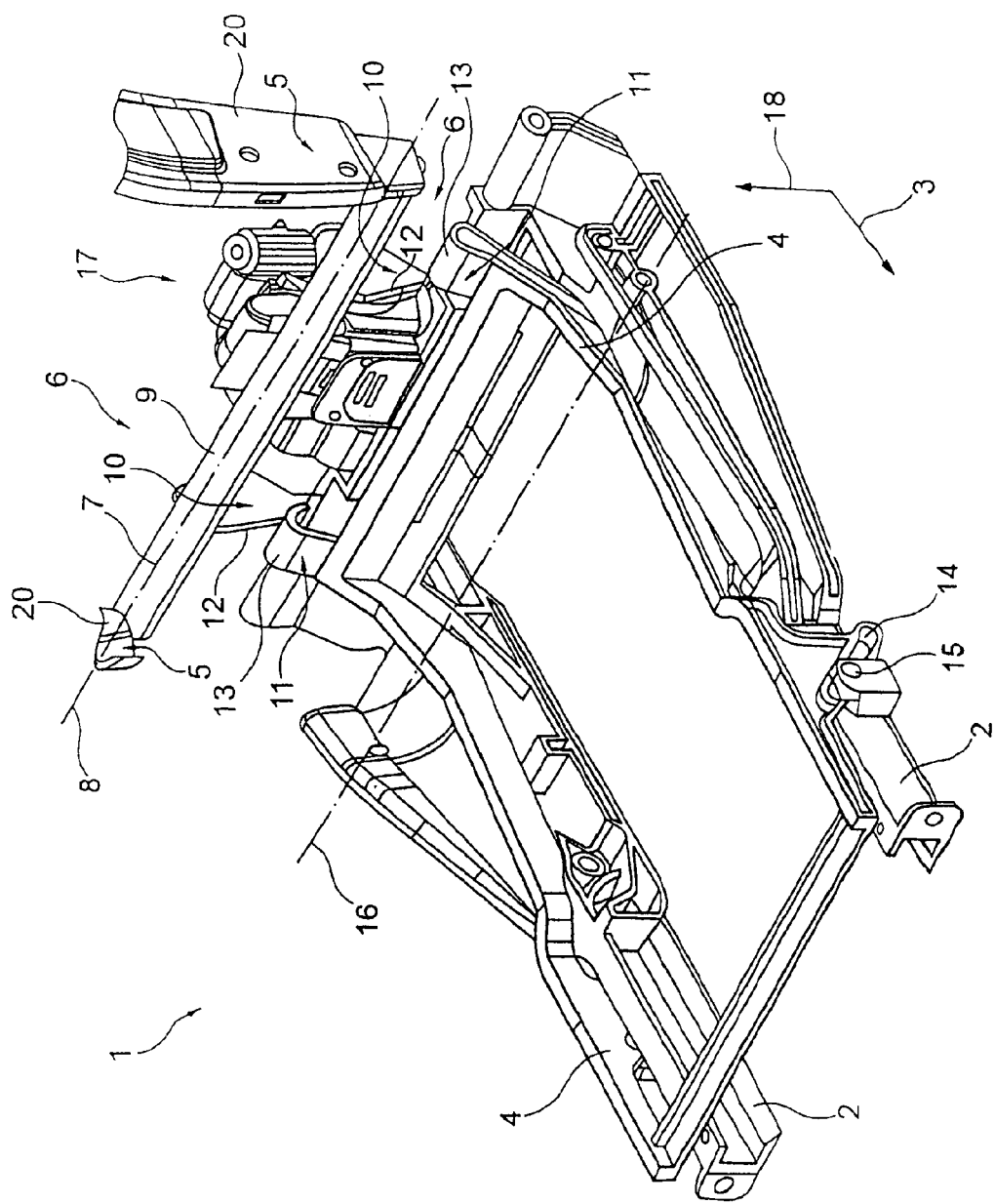
FIG. 1 shows a perspective and schematic view of a motor vehicle seat according to a first embodiment of the invention.
Figure 2:
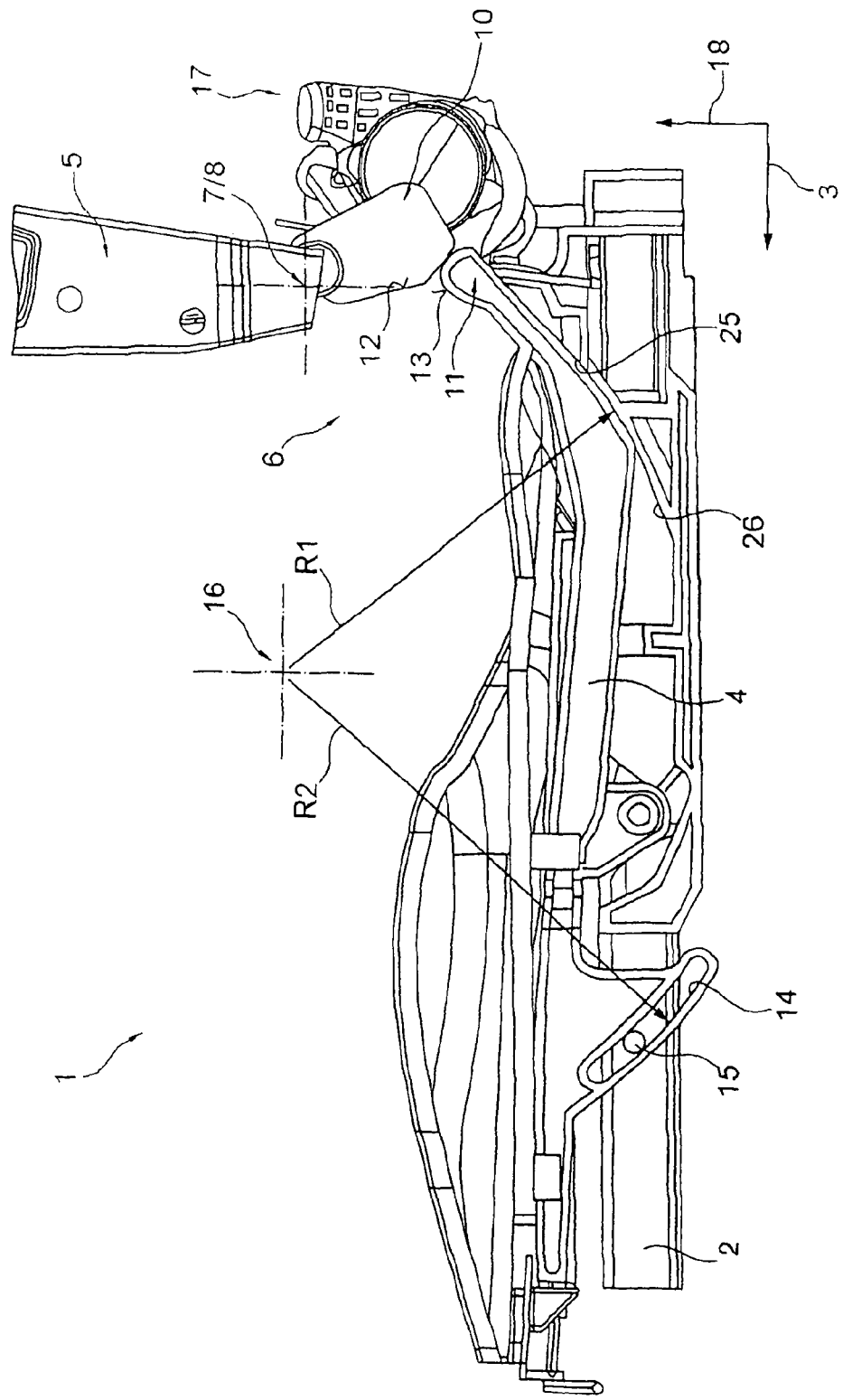
FIG. 2 shows a side view of the motor vehicle seat shown in FIG. 1.

FIGS. 1 and 2 show a motor vehicle seat 1 comprising a base frame 2 for attachment to a vehicle floor (not shown) of a motor vehicle. The base frame 2 is intended to be attached in a longitudinally displaceable manner to guide rails (not shown) which are fixed to the vehicle, and upon deactivation of a locking device (likewise not shown) can be moved in and against a direction of travel 3 of the motor vehicle, which corresponds essentially to a horizontal direction. A seat frame 4 and a backrest frame 5 are in each case directly attached in a pivotable manner to the base frame 2, said seat frame and said backrest frame being intended to hold and support seat cushions (not shown) and being able to transmit a weight force of a user sitting on the motor vehicle seat to the guide rails of the motor vehicle.

The seat frame 4 and the backrest frame 5 are compulsorily coupled by means of a synchronisation device 6 so that, during a movement of the backrest frame 5 relative to the base frame 2, a compulsory pivoting movement of the seat frame 4 takes place about a horizontally running pivot axis 7 oriented orthogonally to the direction of travel 3, although the seat frame 4 and the backrest frame 5 are in each case attached directly to the base frame. For the purposes of movement coupling and compulsory synchronisation, two downwardly protruding control cams 10 which serve as control surfaces are fitted on a lower strut 9 of the backrest frame and interact with two control cams 11 formed integrally as control surfaces on the seat frame 4, the outer surfaces 12, 13 of said control cams being able to roll on one another. A horizontally oriented pivot axis 7 of the backrest frame 5 intersects an adjustment device 17 which is provided for a motor-driven inclination adjustment of the backrest frame 5 independently of the synchronisation device 6 about a pivot axis 8, and also side cheeks 20 of the backrest frame 5. The adjustment device thus makes it possible to override the compulsory movement of the synchronisation device 6, in order to ensure a particularly advantageous inclination adjustment of the backrest frame 5 in a manner tailored to each individual user.

As can be seen in FIG. 2, the seat frame 4 has, in a rear region assigned to the backrest frame 5, a convex bearing surface 25 which can slide on a corresponding, i.e. concave bearing surface 26 of the base frame 2 in the manner of a pivoting movement. In a front region remote from the backrest frame 5, the seat frame 4 is provided with a closed guide eye 14 which has an arc-shaped curvature and is provided for engagement of a guide pin 15 which is fixed to the base frame 2. The centre of curvature of the guide eye 14, the centre of the convex bearing surface 25 and the centre of the concave bearing surface 26, which can also be described as sliding surfaces which are in the form of cylindrical sleeves in some sections, are arranged concentrically with respect to one another and define a pivot axis 16 of the seat frame 4. The pivot axis 16 is oriented parallel to the pivot axes 7 and 8 of the backrest frame 5 and of the adjustment device 17 and is located above the seat frame 4 and also above a surface (not shown) of the seat surface cushion when the motor vehicle seat 1 is installed in its correct position in the motor vehicle. The pivot axis 16 is not a physical axis but rather is merely defined by the sliding bearings 14, 15, 25, 26 between the base frame 2 and the seat frame 4 and is therefore also referred to as a virtual pivot axis 16. The fact that the radii R1 and R2 for the bearing surface 25 and the guide eye 14 are different does not affect the function of the pivot axis 16, since the pivotability is ensured by the concentricity of the curved surfaces.

The convex control cams 10 of the backrest frame 5 are designed for a rolling movement on the likewise convex control cams 11 of the seat frame 4 and are configured for a non-proportional movement transmission between the seat frame 4 and the backrest frame 5. When the backrest frame 5 moves by a certain angle relative to the pivot axis 16, a compulsory pivoting movement of the seat frame 4 about the pivot axis 7 thus takes place. However, the angle of the pivoting movement of the seat frame 4 is dependent on the relative position of the seat frame 4 and backrest frame 5 and varies over the range of angles which the backrest frame 5 can assume with respect to the seat frame 4 or with respect to a vertical direction 18. There is therefore not a uniform movement transmission between the seat frame 4 and the backrest frame 5 over the entire range of angles, but rather the change in the angle of inclination of the backrest frame 5 with respect to the vertical direction 18 varies in accordance with a predefinable, preferably non-linear function with respect to an angle of inclination of the seat surface frame 4, which can be determined in particular on the basis of the direction of travel. A particularly advantageous, autonomous or automatic, anatomically correct adaptation of the inclination of the backrest frame 5 with respect to the seat frame 4 can thus be achieved during an adjustment of the seat frame 4. In the present example of embodiment, a pivoting movement of the seat frame 4 and backrest frame 5 in the same direction is provided. In another embodiment of the invention, which is not shown, a pivoting movement of the backrest frame with respect to the seat frame in the opposite direction can also be provided. It is also conceivable that no further adjustment of the backrest frame takes place past a certain angle position of the seat frame, so as to be able to avoid anatomically disadvantageous backrest positions.

Figure 3:
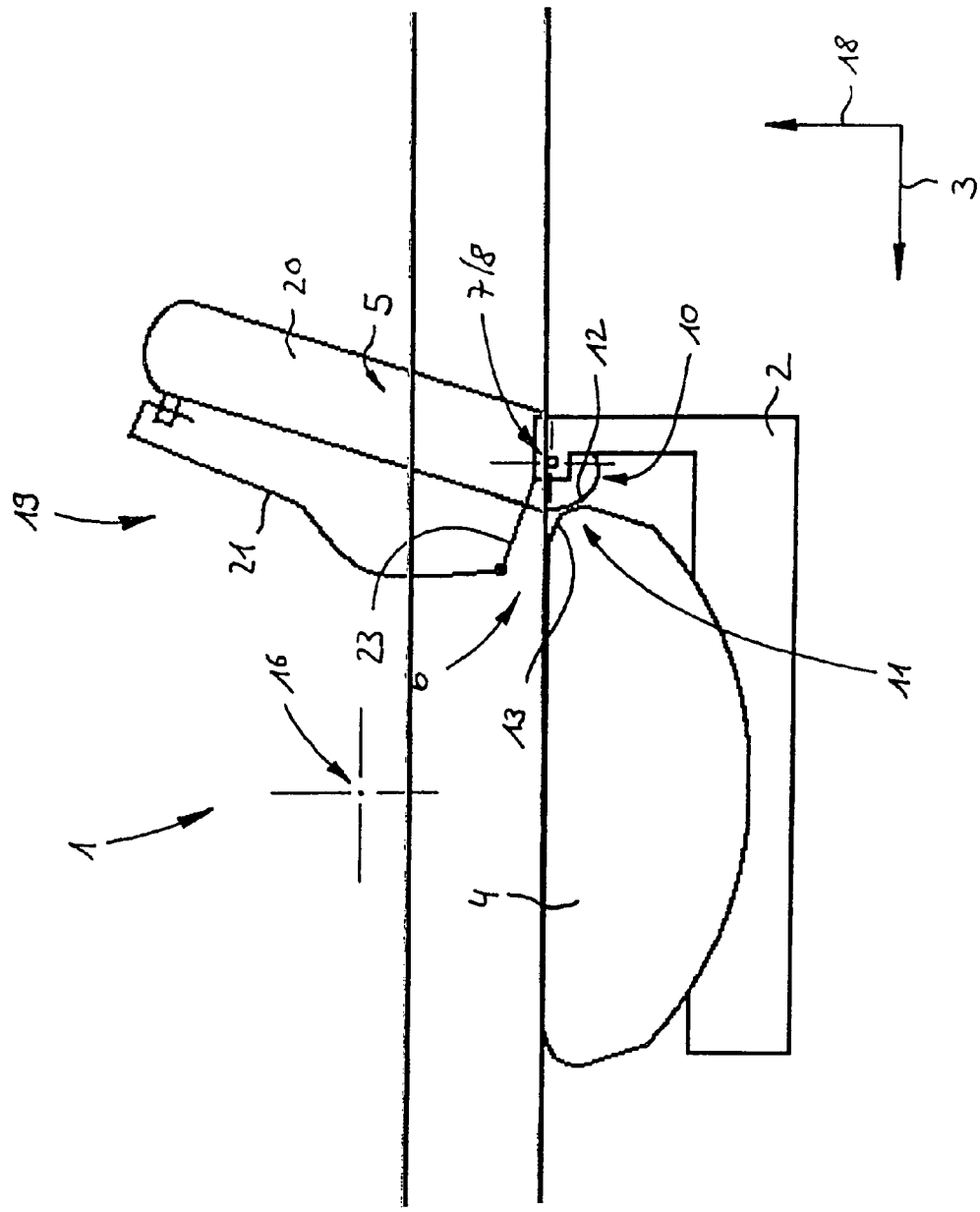
FIG. 3 shows a schematic side view of a motor vehicle seat according to a second embodiment of the invention, said motor vehicle seat being provided with a contour adjustment device.

As shown in FIG. 3, the backrest frame 5 may be assigned a contour adjustment device 19 which in one embodiment of the invention is compulsorily coupled to the synchronisation device 6 and is provided for changing a profiling of a back cushion that can be attached to the backrest frame 5. The contour adjustment device 19 comprises two curved contour rods 21 which extend essentially along side cheeks 20 of the backrest frame 5 and are pivotably attached in guide eyes 23 at the upper end of the backrest frame 5. The contour rods 21 are provided for changing a profiling of the backrest cushion and are not visible in the finished state of the motor vehicle seat 1. At an end region facing towards the seat frame 4, the contour rods 21 are pivotably attached to control levers 23 which are rigidly connected to the base frame 2.

By means of a suitable design it is possible that, when the angle of inclination of the backrest frame 5 with respect to a vertical direction is changed, the contour rods 21 are actuated by the change in position of the backrest frame 5 with respect to the base frame 2, so that a change in the profiling of the backrest cushion which is determined by the contour rods 21 can be achieved. In this case, the contour rods 21 may be actuated via the control levers 23 in such a way that, when the backrest frame 5 is pivoted from an upright position to an inclined position, a considerable profiling is changed into lesser profiling. Converse actuation of the contour rods 21 is also conceivable. For reliable synchronisation of the contour rods 21, an essentially horizontally running coupling rod 22 (not shown) which is oriented parallel to the pivot axes 7, 8 may be provided, said coupling rod having extensions which protrude downwards at right angles and are fixed in a pivoting guide. The pivoting guide can be attached in a pivotable manner to the backrest frame 5 and serves as a stable guide for the coupling rod and thus also for the contour rods 21. The pivoting guide (not shown) may be provided with motor-driven actuation in order to override a compulsory movement of the contour rods 21 dependent on the inclination of the backrest frame 5 and thus allow the user to set a profiling of the backrest cushion which is independent of the inclination of the backrest frame 5.

All the features disclosed in the application documents are claimed as essential to the invention in so far as they are novel individually or in combination with respect to the prior art.

LIST OF REFERENCES

1 motor vehicle seat
2 base frame
3 direction of travel (horizontal direction)
4 seat frame
5 backrest frame
6 synchronisation device
7 pivot axis (backrest frame)
8 pivot axis (adjustment device)
9 lower strut (backrest frame)
10 control cam (backrest frame)
11 control cam (seat frame)
12 outer surface (seat frame)
13 bearing surface (base frame)
14 guide eye (seat frame)
15 guide pin (base frame)
16 pivot axis (seat frame)
17 adjustment device
18 vertical direction
19 contour adjustment device
20 side cheeks
21 contour rods
22 coupling rod
23 control lever
24 pivoting guide
25 bearing surface (seat frame)
26 bearing surface (base frame)

What is claimed:

1. Motor vehicle seat comprising a base frame for attachment to a motor vehicle and also comprising a seat frame and a backrest frame which are adjustably attached to the base frame and are compulsorily coupled by a synchronisation device in such a way that, during a movement of the backrest frame relative to the base frame, a compulsory pivoting movement of the seat frame relative to the base frame and/or to the backrest frame takes place, wherein the synchronisation device is designed for a non-proportional pivoting movement of the seat frame during a movement of the backrest frame relative to the base frame, wherein the seat frame is attached in a pivotable manner to the base frame such that the seat frame pivots around a pivot axis located at a distance from the seat frame in a region remote from the base frame, the synchronisation device has a first control surface which is assigned to the seat frame and a second control surface which is assigned to the backrest frame, which control surfaces are designed for compulsory movement transmission between the seat frame and the backrest frame, and wherein the first control surface interacts with the second control surface.

2. Motor vehicle seat according to claim 1, characterised in that a pivot axis of the backrest frame is oriented essentially parallel to the pivot axis of the seat frame and intersects the backrest frame.

3. Motor vehicle seat according to claim 1, wherein the control surfaces of the seat frame and of the backrest frame are arranged with respect to one another in such a way that, during a relative movement of the seat frame with respect to the base frame, a rolling movement of the control surfaces takes place, in particular in the manner of control cams.

4. Motor vehicle seat according to claim 1, wherein the seat frame has, in a front region facing away from the backrest frame, an elongate hole guide which is shaped similar to an arc which is attached to the base frame by means of a guide pin, and the base frame has a sliding surface, in a rear region facing towards the backrest frame, which is shaped in a manner corresponding to the seat frame and is in the form of a cylindrical sleeve in some sections, on which sliding surface of the seat frame bears in such a manner that it the seat frame can be displaced compulsorily by the synchronisation device.

5. Motor vehicle seat according to claim 1, wherein the synchronisation device is designed for pivoting movements of the seat frame and backrest frame in the same direction.

6. Motor vehicle seat according to claim 1, wherein the backrest frame has an adjustment device which is assigned to the synchronisation device and is designed for an inclination adjustment of the backrest frame independently of a position of the seat frame.

7. Motor vehicle seat according to claim 1, wherein the backrest frame is assigned a contour adjustment device which is preferably compulsorily coupled to the synchronisation device.

8. Motor vehicle seat according to claim 7, wherein the contour adjustment device comprises two curved contour rods which extend essentially along side cheeks of the backrest frame and are pivotably attached to the backrest frame, said contour rods preferably being compulsorily coupled by a coupling rod arranged such that the contour rods can be pivoted out between the side cheeks.

* * * * *